Nov. 3, 1959                L. N. DAVIS                 2,911,227
        COLLAPSIBLE CHILD'S SEAT FOR A NESTING TYPE SHOPPING CARRIER
Filed April 25, 1958                              3 Sheets-Sheet 1

INVENTOR.
LYNN N. DAVIS
BY
Woodhams Blanchard and Flynn
ATTORNEYS

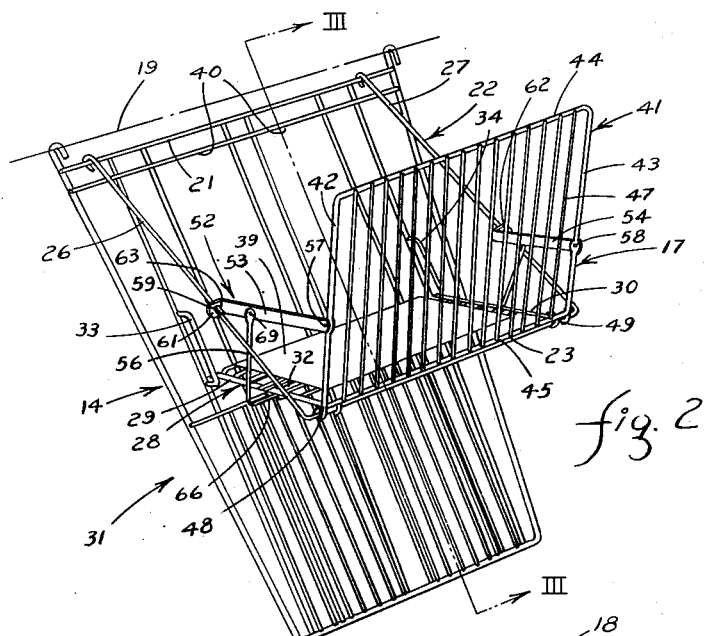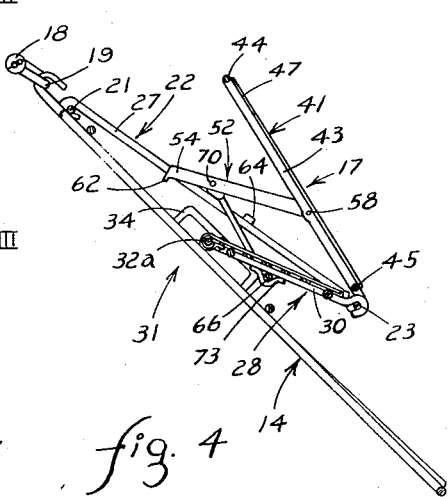

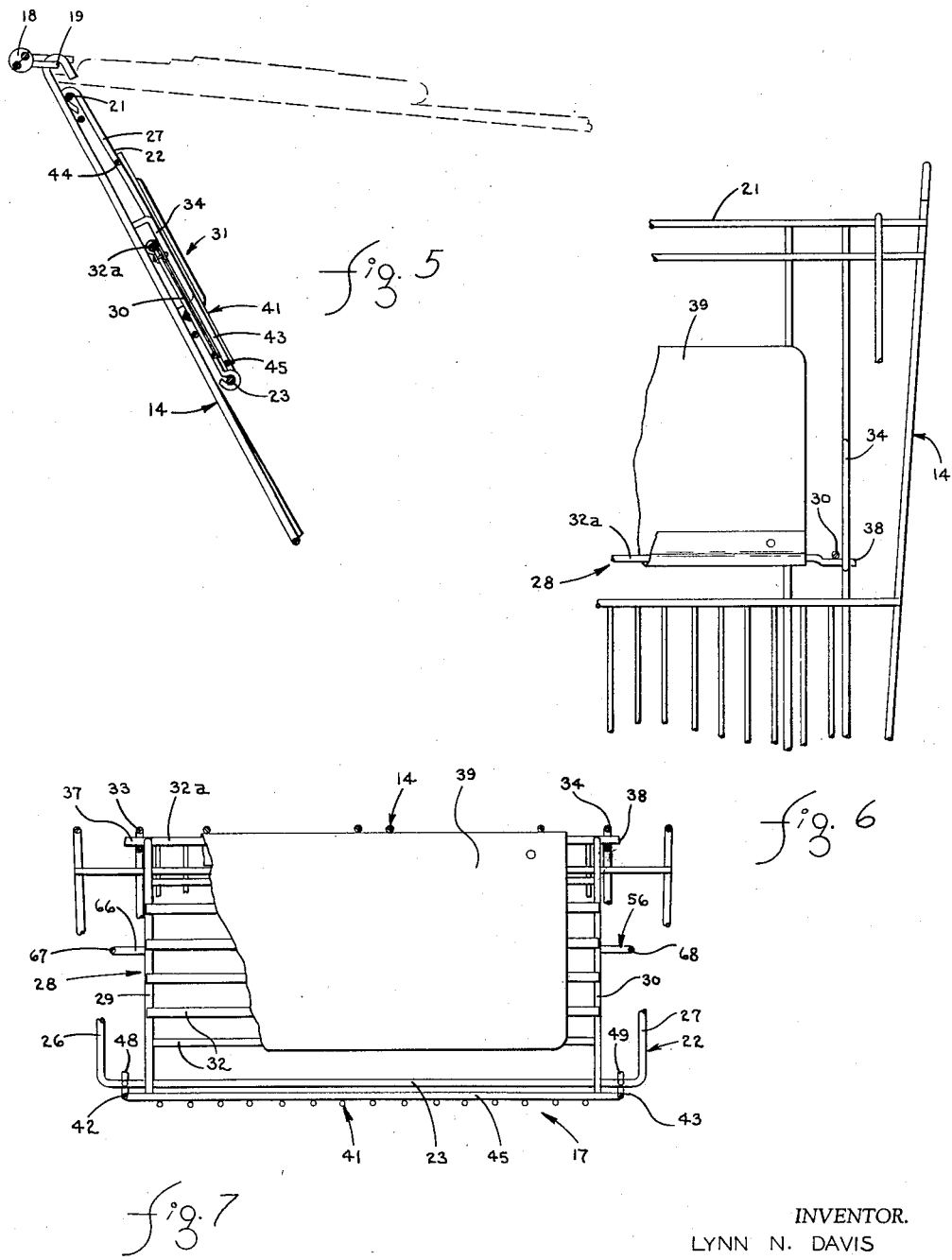

United States Patent Office 2,911,227
Patented Nov. 3, 1959

2,911,227

COLLAPSIBLE CHILD'S SEAT FOR A NESTING TYPE SHOPPING CARRIER

Lynn N. Davis, Emmett Township, Calhoun County, Mich., assignor to United Steel and Wire Company, Battle Creek, Mich., a corporation of Michigan Application April 25, 1958, Serial No. 730,944

11 Claims. (Cl. 280—33.99)

This invention relates in general to a collapsible child's seat supported upon the article carrying basket of a nesting type shopping carrier and, more particularly, to a type of seat which is supported upon the horizontally pivoted end wall of said basket and which collapses automatically when said end wall is moved upwardly into a horizontal position in response to nesting of the carrier.

The child's seat has become a very important part of wheeled shopping carriers, such as of the type used in supermarkets. As a general rule, the child's seat is located near the rear of, and within, the article carrying basket of the shopping carrier, so that the child will be within easy reach of the person using the shopping carrier. When the shopping carrier is of the nesting type, it is practically essential that the child's seat be collapsible, particularly if it is at the rear of the article basket. However, this arrangement is complicated by the fact that the rear end wall or end gate of the nesting type shopping carrier is usually pivoted about its upper edge in order to permit the nesting operation. Thus, it is desirable to arrange the child's seat so that it will collapse against the pivoted end wall upon which it is at least partially supported when the shopping carrier of which it is a part is nested with another, similar shopping carrier.

In the development of existing collapsible child's seats for the nesting shopping carrier, several problems have persisted. Among the most important of these is that the use of such seat structure either fills, or obstructs the use of, not only the space within the rear end of the article carrying basket actually used by the occupant of the seat, but also the space located directly beneath the seat. Thus, when existing types of collapsible child's seats are being use, the carrying capacity of the basket is substantially reduced. It is desirable to reduce the space thus lost as much as possible.

Accordingly, a primary object of this invention has been the provision of an automatically collapsible seat structure for a nesting shopping carrier wherein said seat is supported upon the swingable rear end wall of the article containing basket of said shopping carrier, wherein the seat structure will collapse automatically whenever the end wall upon which it is supported is raised into a substantially horizontal position.

A further object of this invention has been the provision of a shopping carrier, as aforesaid, having a collapsible child's seat including structure whereby said seat can also serve to provide an auxiliary compartment within the article carrying basket in which certain small or fragile articles can be placed to protect them from damage by the larger packages which are placed in the shopping carrier basket.

A further object of this invention has been the provision of a shopping carrier, as aforesaid, having a collapsible child's seat which can be moved into, and remain in, the open position without obstructing the free and complete usage of that part of the article carrying basket in which the seat is located and not actually occupied by the occupant of said seat.

A further object of this invention has been the provision of a collapsible child's seat, as aforesaid, which is relatively simple in construction, which is foolproof in operation, which requires a minimum of cost to fabricate and assemble, and which can be easily adapted for use with existing shopping carriers, having the swingable type of end wall.

A further object of this invention has been the provision of a collapsible child's seat, as aforesaid, which requires a minimum of parts and, therefore, is relatively light in weight, which is strong and durable in construction, which cannot be accidentally collapsed while supporting a load, and which is suspended upon the end wall of the article carrying basket in such a manner that it is capable of carrying large loads without damage thereto or accidental collapsing.

Other objects and purposes of this invention will become apparent to persons familiar with this type of equipment upon reading the following specification and examining the drawings, in which:

Figure 2 is a perspective view of an end wall and seat assembly embodying the invention.

Figure 3 is a sectional view substantially as taken along the line III—III of Figure 2.

Figure 4 is a sectional view showing the structure of Figure 3 in a different operating position.

Figure 5 is a sectional view showing the structure of Figure 3 in another operating position.

Figure 6 is a sectional view substantially as taken along the line VI—VI of Figure 3 with the seat cover plate in the raised position.

Figure 7 is a broken sectional view substantially as taken along the line VII—VII of Figure 3.

Figure 1:
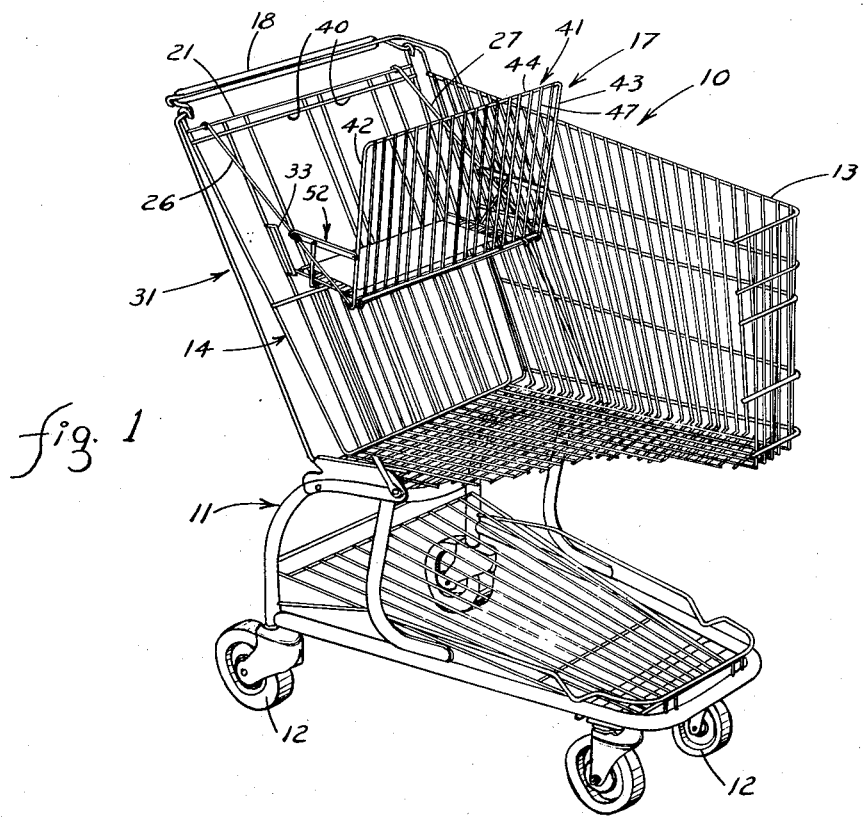
Figure 1 is a broken perspective view of a nesting shopping carrier embodying the invention.

For the purposes of convenience in description, the terms "upper," "lower," and derivatives thereof will have reference to the shopping carrier and the child's seat embodying the invention in their normal position of use and as shown in Figures 1 and 2. The terms "front," "rear" and derivatives thereof will have reference to the normal direction of movement of a shopping carrier of the type disclosed herein. The terms "inner," "outer" and derivatives thereof will have reference to the geometric center of the shopping carrier and parts thereof, such as the child's seat embodying the invention.

*General description*

The objects of this invention, including those set forth above, have been attained by providing a wheeled shopping carrier of the nesting type having a large article carrying basket with an end wall or gate swingably supported for movement around a horizontal axis into, and out of, a basket closing position. The collapsible seat structure is supported upon and movable with said end wall and includes a hanger member which is pivotally supported upon the end wall for movement around a first axis parallel with said horizontal axis. The seat structure also includes a seat member and a back member which are pivotally secured along one edge of each upon said hanger member for movement around a second axis parallel with said horizontal axis. The other edge of the seat member is engaged by guide means on the swingable end wall whereby the pivotal movement of said seat member is limited. Linkage is connected to the seat member, the back member and the hanger member, whereby their movements are coordinated whenever the seat structure is moved between the open position and the collapsed position.

The seat structure is easily collapsed either by manual engagement or by positive engagement with part of another, similar carrier when the carrier with which said seat is associated is nested with said similar carrier. When in said collapsed position, both the seat member and the back member are adjacent to, and substantially parallel with, the end wall on the basket. The seat structure is also arranged so that it is automatically collapsed by the force of gravity acting thereon whenever the swingable end wall, upon which it is supported, is moved upwardly into its substantially horizontal, nesting position.

*Detailed construction*

As the description proceeds, it will be apparent that the seat structure of the invention will be usable with many different designs of carriers and hence the use of one particular carrier to illustrate the invention will be understood as illustrative only and not limiting.

The shopping carrier 10 (Figure 1), which is here utilized for the purpose of illustrating the invention, includes a frame 11 mounted upon castered wheels 12 and supporting an article carrying basket 13 which opens upwardly and rearwardly. An end wall or gate 14 is swingably supported upon said frame 11 near the upper edge of the basket 13 for movement around a substantially horizontal axis 19 out of, and into, a position closing the rearward end of said basket 13. A seat structure 17 is supported upon the end wall 14 for movement between a fully collapsed position (Figure 5) adjacent to said end wall 14 and a fully operative position (Figures 2 and 3).

In this particular embodiment, a handle 18 (Figure 1) is mounted upon the rearward upper end of the frame 11 adjacent to, and substantially parallel with, the axis 19 (Figure 1) about which the end wall 14 swings from its closed position to its open and nesting position (Figure 5). Said end wall 14 has a pivot rod 21 adjacent to its upper edge and substantially parallel with the swing axis 19.

Turning now to the seat structure 31 which comprises the invention, the device is shown as formed of steel bars fastened together by welding, but this will be recognized as illustrative only. Other materials and construction methods may be used as desired or appropriate in a given instance. A hanger member 22, which is preferably U-shaped, has a pair of substantially parallel arms 26 and 27 which are connected at corresponding ends of each to the opposite ends of a crossbar 23. Said arms are pivotally supported near their free ends upon the pivot rod 21 near the ends thereof, so that said crossbar 23 is substantially parallel with said pivot rod 21.

The seat member 28 (Figures 3 and 7), which is preferably rectangular, is comprised of a pair of spaced and preferably parallel side elements 29 and 30 and a plurality of transverse elements 32, which are secured near their opposite ends to said side elements 29 and 30.

The side elements 29 and 30 (Figure 7) are pivotally connected at the rear edge of the seat member 28 to the crossbar 23 near the opposite ends thereof. A pair of elongated and rigid guide loops 33 and 34 (Figure 2) are provided upon the inner side of the end wall 14 about midway between the upper and lower edges thereof so that they are horizontally aligned and are spaced from each other a distance slightly greater than the distance between the side elements 29 and 30. The transverse element 32a (Figure 7) at the front edge of the seat member 28 is substantially parallel with the crossbar 23 and has end portions 37 and 38 which extend beyond the side elements 29 and 30, respectively, for slidable reception into the guide loops 33 and 34, respectively. When the seat structure 17 is in its open and operable position, as shown in Figures 1 and 2, the end portions 37 and 38 on the seat member 28 are supported within the lower ends of the guide loops 33 and 34, and the seat member 28 is disposed in a substantially horizontal position (Figure 2) about midway between the upper and lower ends of the end wall 14. The guide loops 33 and 34 extend upwardly a distance to permit upward movement of the end portions 37 and 38 as the seat member 28 is pivoted around the crossbar 23 from its horizontal position of Figure 3 into its collapsed position adjacent to, and substantially parallel with, the end wall 14, as shown in Figure 5. It follows that the hanger member 22 moves with the seat member 28 into a position adjacent to, and substantially parallel with, said end wall 14.

A seat cover panel 39 (Figures 2 and 7) is pivotally supported adjacent to one edge thereof upon the transverse element 32a of said seat member 28 for movement between a substantially horizontal position adjacent to the seat member 28, as shown in Figure 3, to a position adjacent to, and parallel with, the end wall 14, as shown in Figure 6. When said seat cover panel 39 is in the Figure 6 position, it serves to close the leg openings 40 in the end wall 14, which openings extend upwardly a substantial distance from points preferably located below a line connecting the lower ends of the guide loops 33 and 34.

The back member 41 is comprised of a rectangular frame having a pair of spaced and parallel side elements 42 and 43, and a pair of spaced and parallel upper and lower elements 44 and 45, respectively. A plurality of transverse elements 47 are secured to, and extend between, the upper and lower elements 44 and 45. The back member 41 is pivotally supported upon the crossbar 23 of the hanger member 22 by means of the hooks 48 and 49, which are formed on extensions of the side elements 42 and 43, respectively.

Figure 8:
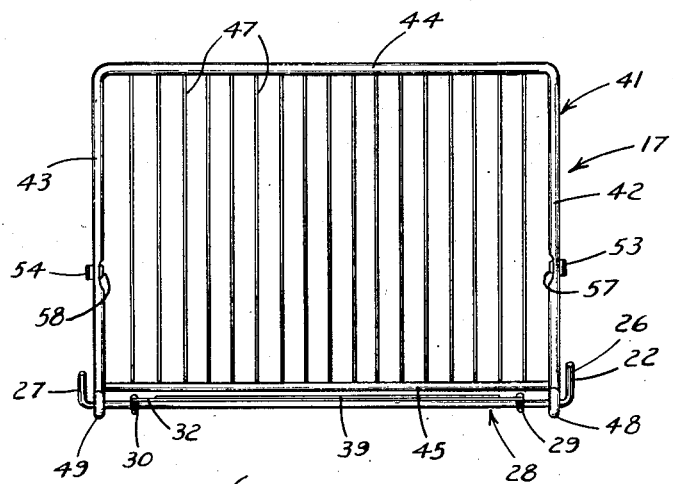
Figure 8 is a sectional view substantially as taken along the line VIII—VIII of Figure 3.

The hanger member 22, seat member 28 and back member 41 are operably interconnected by linkage 52 (Figures 2 and 3), which functions also as arm rests. This linkage 52 includes a pair of spaced, parallel arm rest bars 53 and 54 and a U-shaped lift member 56. The arm rest bars 53 and 54 (Figures 2 and 8) are pivotally supported near one end of each upon the side elements 42 and 43, respectively, by means of the pivot pins 57 and 58, which are substantially coaxial and equally spaced from the crossbar 23. The other ends of the arm rest bars 53 and 54 have integral, outwardly extending flanges 61 and 62 which are preferably spaced from their respective pivot pins 57 and 58 approximately the same distance. Said flanges are provided with openings, such as the opening 59 in flange 61 (Figure 2), through which the arms 26 and 27, respectively, are slidably received. The arms 26 and 27 have stop members 63 and 64 (Figures 2 and 4, respectively), secured thereto, as by welding, which are preferably spaced equidistantly from the crossbar 23. Said stop members 63 and 64 are arranged so that they will engage the flanges 61 and 62, respectively, and will thereby prevent further movement thereof toward the crossbar 23.

The lift member 56, which is substantially U-shaped, has a pair of spaced and parallel side rods 67 and 68, which are connected at corresponding ends to the opposite ends of a pivot rod 66. Said pivot rod 66 extends under, and adjacent to, the seat member 28 parallel with, and approximately midway between, the transverse element 32a and the crossbar 23. Said side rods 67 and 68 extend upwardly past, and outwardly of, the side elements 29 and 30 on the seat member 28. The upper free ends of the side rods 67 and 68 are pivotally secured by means of the pins 69 and 70 upon the lever bars 53 and 54, respectively, at points equally spaced from the pivot pins 57 and 58, respectively. The pivot rod 66 is pivotally held adjacent to the lower surface of the seat member 28 by means of brackets, such as the bracket 73 shown in Figures 3 and 4, which are secured to the side elements 29 and 30,

Operation

For the purposes of illustration, it will be assumed that said seat structure 17 is in its collapsed position as shown in Figure 5. When it becomes desirable to extend the seat structure 17 into its operable position, as shown in Figures 2 and 3, the back member 41 is manually engaged and moved away from the end wall 14 until the end portions 37 and 38 of the transverse element 32a engage the lower ends of the guide loops 33 and 34. At this time, the flanges 61 and 62 on the arm rest bars 53 and 54 will engage the stop members 63 and 64 on the hanger arms 26 and 27, respectively. The brackets 73, pivot pins 69 and 70, pivot pins 57 and 58, and hooks 48 and 49 are so arranged with respect to each other that they define the corners of a pair of parallelograms on opposite sides of the seat structure 17. Accordingly, pivotal movement of either the seat member 28 or the back member 41 around the crossbar 23 effects a corresponding and simultaneous pivotal movement of the other of these two members. At the point where the end portions 37 and 38 engage the lower end of the loops 33 and 34, and the flanges 61 and 62 engage the stops 63 and 64, the lift member 56 will have rotated through more than 90 degrees from its collapsed position, which places its upper end forwardly (rightwardly in Figure 3) of the pivot axis of its pivot rod 66. This locks the seat rigidly in open position regardless of the squirmings of the occupant of the seat.

If the seat structure 17 is to be used for supporting a child, the seat cover panel 39 is placed in its Figure 2 position so that the leg openings 40 in the end wall 14 are unobstructed. Any load placed upon the seat member 28 will be supported along its rearward edge by the hanger member 22 and along its forward edge by the lower ends of the guide loops 33 and 34. Thus, the load is wholly supported on and by the end wall 14 upon which both the hanger member 22 and said guide loops 33 and 34 are supported. Loads imposed upon the back member 41 in a direction away from end wall 14 will be supported by the hooks 48 and 49, which engage the crossbar 23, and by the arm rest bars 53 and 54 which engage the stop members 63 and 64 on the arms 26 and 27 to limit rotation of said back member about the crossbar 23.

Accordingly, any load placed upon the seat cover panel 39 (Figures 1 and 2) will, together with the locking above mentioned, positively oppose an accidental collapse of the seat structure 17 while it is in its operating position and the end wall 14 is substantially in its closed position of Figure 1. That is, the weight on the seat member 28 (Figure 7) will cause the end portions 37 and 38 of the transverse element 32a to remain adjacent to the lower ends of the guide loops 33 and 34 and the lift member 56 will tend to prevent upward movement of the arm rest bars 53 and 54 (Figure 2) away from the stop members 63 and 64, which movement must occur to effect a collapse of the seat structure.

If it becomes desirable to use the seat structure 17 to carry small articles in a compartment separate from the remainder of the basket 13, the seat cover panel 39 is pivoted around the transverse element 32a into its Figure 6 position adjacent to, and parallel with, the end wall 14 to close the leg openings in the end wall 14.

The seat structure 17 (Figure 2) may be collapsed by positively, as manually, engaging the back member 41 and moving it toward the end wall 14. As shown in Figures 3 and 4, the angular relationship between the seat member 28 and the end wall 14, as well as the angular relationship between the arm rest bars 53 and 54 and the hanger arms 26 and 27, respectively, are such that the seat structure 17 will tend to move easily into the collapsed position with only a small amount of force applide the to back member 41 to urge same toward the end wall 14. This moves the upper end of the side rods 67 and 68 leftwardly (Figure 3) past the center of rotation of the pivot rod 66 and thereby, as the arm rests slide up the arms 26 and 27, lifts the rearward (leftward) edge of the seat structure. The rearward (leftward) end of the seat will now follow the loops 33 and 34 while the guides 61 and 62 follow the rods 26 and 27, respectively, and the seat structure 31 collapses smoothly into closed position.

The seat structure 17 can be automatically collapsed by gravity by pivoting the end wall 41 into substantially its nested position. That is, as the end wall 14 is pivoted from its open (Figure 3) position toward its nesting position, as shown in broken lines in Figure 5, it reaches a position, about as shown in Figure 4. In this Figure 4 position, the back member 41 will extend rearwardly from the crossbar 23 a greater distance than does the seat member 28 at which point the torque which it creates, due to gravity, in one direction (counterclockwise as shown in Figure 4) around the crossbar 23 will overcome the torque created by the seat member 28 in the opposite direction. The resultant torque, operating through the linkage 52, together with the movement rearwardly under gravity of the upper ends of the side bars 67 and 68, will cause the seat member and the back member to move toward each other and collapse against the end wall 14.

Thus, it will be seen that the seat structure, when placed into its closed position will tend to remain there regardless of the position of the end wall 14. On the other hand, the distribution of weight with respect to the several pivot points, and the locking effect of the lift bar 56, is such that the seat structure 17 will remain in its extended, or open, position when it is placed there as long as the end wall remains in a substantially closed, (Figure 3), position. However, if the back member 41 is positively moved approximately half-way toward the end wall 14, or if the end wall is pivoted upwardly beyond a position approximately as appearing in Figure 4, the seat structure 17 will collapse by gravity into its Figure 5 position.

Although a particular preferred embodiment of the invention has been disclosed in detail above for illustrative purposes, it will be understood that variations or modifications of such disclosure, which lie within the scope of the appended claims, are fully contemplated.

What is claimed is:

1. A collapsible seat structure for a nesting type shopping carrier having an article receiving basket with an end wall supported near the upper edge thereof for pivotal movement about a horizontal axis, comprising: hanger means within said basket pivotally supported upon said end wall near the upper edge thereof for movement about a first axis; a seat member pivotally supported near one edge upon said hanger member for rotation about a second axis substantially parallel with, and spaced from, said first axis; guide means on said end wall slidably engaging said seat member near the edge thereof parallel with, and remote from, said second axis, said guide means limiting pivotal movement of said seat member to an angle of less than 90 degrees around said second axis, one terminal position of said movement being substantially parallel with said end wall and above said second axis; a back member pivotally supported near its lower edge upon said hanger member for movement about said second axis; and linkage pivotally secured to said back member and said seat member and slidably engaged with said hanger member for pivoting said seat member toward said one terminal position in response ot movement of said back member toward said end wall.

2. The structure of claim 1 wherein said end wall has a pair of openings therethrough extending upwardly from the lower edge of said guide means; and wherein a cover panel is pivotally supported along one edge thereof upon said seat member adjacent said end wall for movement around a third axis parallel with said second axis between a position substantially parallel with said end wall and a position substantially parallel with, and adjacent to, said seat member.

3. The structure of claim 1 wherein said hanger member is a U-shaped element having a crossbar which extends substantially along said second axis, and having arms which are pivotally secured near their free ends upon said end wall adjacent to the respective edges thereof.

4. The structure of claim 3 wherein said linkage includes a pair of substantially parallel lever bars pivotally supported at one end of each upon opposite sides of said back member for pivotal movement about an axis spaced from, and parallel with, said second axis, the other ends of said lever bars being slidably engaged, respectively, with said arms on said hanger member, and a pair of lift bars pivotally secured at the upper ends of each respectively upon said lever bars for movement about an axis parallel with said second axis and spaced from the ends of said lever bars, the lower ends of said lift bars being pivotally secured with respect to said seat member about midway between said second axis and the opposite edge of said seat member.

5. A collapsible compartment for the article basket of a nesting shopping carrier, comprising: an end wall pivotally supported near its upper edge upon said shopping carrier for movement around a horizontal axis into and out of a position closing the rear end of said basket; a hanger member pivotally supported upon said end wall near the upper edge thereof for movement about a second axis substantially parallel with said horizontal axis; a bottom wall pivotally supported near one edge thereof upon said hanger member for pivotal movement about a third axis parallel with said second axis; guide means on said end wall spaced from the lower edge thereof and engageable with said bottom wall near the opposite edge thereof, the pivotal movement of said bottom wall being limited by said guide means to an angle of less than 90 degrees, one terminal position of said bottom wall being adjacent to, and parallel with, said end wall; a side wall pivotally supported along its lower edge upon said hanger member for movement about said third axis, said side wall being movable into and out of a position substantially adjacent to, and parallel with, said bottom wall; and linkage connected between said bottom wall and said side wall and movably engaged with said hanger member for effecting concurrent movement of said bottom wall and said side wall from said parallel positions into positions substantially at right angles to each other and on opposite sides of a plane defined by said hanger member.

6. The structure of claim 5 wherein said side wall, said bottom wall, said linkage and said hanger member remain at all times substantially between a first plane substantially perpendicular to said end wall and including said second axis and a second plane including said third axis and substantially parallel with said first plane, said third plane being spaced a substantial distance from the lower edge of said end wall.

7. The structure of claim 5 wherein said hanger member includes a pair of spaced parallel hanger arms extending between said second and third axes, and said linkage includes a pair of spaced, substantially parallel lever bars pivotally secured at one end of each to said side wall and slidably engaged, respectively, with said hanger arms, and a pair of links pivotally connected between said lever bars and said bottom wall, whereby movement of said end wall into a substantially horizontal position causes said side wall and said bottom wall to move automatically in response to gravity into said parallel positions.

8. A collapsible seat structure for a nesting type shopping carrier having an article receiving basket with an end wall supported near the upper edge thereof for pivotal movement about a horizontal axis, comprising: hanger means within said basket pivotally supported upon said end wall near the upper edge thereof for movement about a first axis; a seat member supported by said hanger member for pivotal movement about a second axis near one edge of said seat member and substantially parallel with, and spaced from, said first axis; guide means on said end wall spaced from the lower edge thereof and slidably engaging said seat member near an edge thereof parallel with, and remote from, said one edge, said guide means limiting pivotal movement of said seat member to an angle of less than approximately 90 degrees around said second axis, one terminal position of said movement being substantially parallel with said end wall and above said second axis; a back member supported near its lower edge upon said hanger member for pivotal movement about an axis substantially parallel with said first axis and disposed near said one edge of said seat member; and linkage pivotally secured to said back member and said seat member and slidably engaged with said hanger member for pivoting said seat member toward said one terminal position in response to movement of said back member toward said end wall.

9. A collapsible seat structure for a nesting type shopping carrier having an article receiving basket with an end wall supported near the upper edge thereof for pivotal movement about a horizontal axis, comprising: hanger means within said basket pivotally supported upon said end wall near the upper edge thereof for movement about a first axis; a seat member pivotally supported near one edge upon said hanger member for movement about a second axis substantially parallel with, and spaced from, said first axis; guide means on said end wall spaced from the lower edge thereof and engaging said seat member near the edge thereof parallel with, and remote from, said one edge, said guide means limiting pivotal movement of said seat member to an angle of less than approximately 90 degrees around said second axis, one terminal position of said movement being substantially parallel with said end wall and above said second axis; a back member supported near its lower edge upon said hanger member for pivotal movement about an axis disposed near said one edge of said seat member and substantially parallel with said first axis; and linkage pivotally secured to said back member and said seat member and slidably engaged with said hanger member for pivoting said seat member toward said one terminal position in response to movement of said back member toward said end wall.

10. A collapsible seat structure for a nesting type shopping carrier having an article receiving basket with an end wall supported near the upper edge thereof for pivotal movement about a horizontal axis, comprising: hanger means within said basket supported upon said end wall near the upper edge thereof for pivotal movement about a first axis; a seat member supported upon said hanger member for pivotal movement about a second axis near one edge of said seat member and substantially parallel with, and spaced from, said first axis; guide means on said end wall spaced from the lower edge thereof and engaging said seat member near the edge thereof parallel with, and remote from, said one edge, said guide means limiting pivotal movement of said seat member to an angle of less than approximately 90 degrees around said second axis, one terminal position of said movement being substantially parallel with said end wall and above said second axis; a back member supported upon said hanger member near said one edge of said seat member for pivotal movement about an axis substantially parallel with said first axis and near said one edge of said seat member; a pair of link elements pivotally secured with respect to each other near one end of each, said elements having a first connection near the pivot axis thereof with said hanger member at a point spaced from said second axis and said elements having a pair of second connections remote from said pivot axis with said seat member and said back member, one of said first connections and said pair of second connections being pivotal and the other being slidable, whereby said seat member is pivoted toward said one terminal position in response to movement of said back member toward said end wall; and means for limiting said slidable movement of the slidable connection during movement of said back member away from said end wall.

11. A collapsible seat structure for a nesting type shopping carrier having an article receiving basket with an end wall supported near the upper edge thereof for pivotal movement about a horizontal axis, comprising: hanger means within said basket supported upon said end wall near the upper edge thereof for pivotal movement about a first axis; a seat member supported upon said hanger member for pivotal movement about a second axis near one edge of said seat member and substantially parallel with said first axis; guide means on said end wall spaced from the lower edge thereof and engaging said seat member near another edge thereof parallel with said one edge, said guide means limiting movement of said seat member, one position of said seat member being substantially parallel with said end wall and above said second axis; a back member supported near its lower edge by said hanger member for pivotal movement about an axis near said one edge of said seat member and substantially parallel with said first axis; and linkage connecting said back member and said seat member with said hanger member for pivoting said seat member toward said one position in response to movement of said back member toward said end wall, said seat member and said back member being entirely supported upon said end wall.

References Cited in the file of this patent

UNITED STATES PATENTS

| | | |
|---|---|---|
| 2,813,725 | Hoedinghaus et al. | Nov. 19, 1957 |
| 2,837,344 | Young | June 3, 1958 |
| 2,837,345 | Young | June 3, 1958 |